(12) United States Patent
Yoon

(10) Patent No.: US 7,072,013 B2
(45) Date of Patent: Jul. 4, 2006

(54) LIQUID CRYSTAL DISPLAY DEVICE HAVING CHOLESTERIC LIQUID CRYSTAL POLARIZING FILM AND INTERNAL RETARDATION FILM AND INTERNAL POLARIZING FILM

(75) Inventor: Sunghoe Yoon, Anyang-Si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/607,207

(22) Filed: Jun. 27, 2003

(65) Prior Publication Data

US 2004/0008301 A1    Jan. 15, 2004

(30) Foreign Application Priority Data

Jul. 10, 2002   (KR) .................. 10-2002-0039981
Aug. 22, 2002  (KR) .................. 10-2002-0049846

(51) Int. Cl.
    *G02F 1/1335* (2006.01)
(52) U.S. Cl. .................. 349/115; 349/96; 349/98; 349/106; 349/117; 252/299.01
(58) Field of Classification Search ................ 349/96, 349/114, 98, 194, 115, 179, 117
    See application file for complete search history.

(56) References Cited

U.S. PATENT DOCUMENTS

| | | | |
|---|---|---|---|
| 5,730,899 A * | 3/1998 | Ohnishi et al. | ........ 252/299.01 |
| 5,737,044 A | 4/1998 | Van Haaren et al. | |
| 5,805,250 A * | 9/1998 | Hatano et al. | ................ 349/96 |
| 5,822,029 A | 10/1998 | Davis et al. | |
| 5,899,551 A * | 5/1999 | Neijzen et al. | ............. 349/115 |
| 6,061,108 A * | 5/2000 | Anderson et al. | ............. 349/98 |
| 6,320,629 B1 * | 11/2001 | Hatano et al. | ................ 349/15 |
| 6,342,934 B1 * | 1/2002 | Kameyama et al. | .......... 349/98 |
| 6,421,107 B1 | 7/2002 | Greenfield et al. | |
| 2001/0026335 A1 * | 10/2001 | Moon | ......................... 349/63 |
| 2001/0055083 A1 * | 12/2001 | Jiang et al. | ................. 349/115 |
| 2002/0163616 A1 * | 11/2002 | Jones et al. | ................. 349/187 |
| 2003/0095228 A1 * | 5/2003 | Hiji et al. | .................... 349/177 |
| 2003/0112392 A1 | 6/2003 | Moon et al. | |
| 2003/0147016 A1 * | 8/2003 | Lin et al. | ...................... 349/12 |

FOREIGN PATENT DOCUMENTS

EP     0 720 041 A3    5/1997

OTHER PUBLICATIONS

Search Report Under Section 17.

* cited by examiner

*Primary Examiner*—Andrew Schechter
*Assistant Examiner*—(Nancy) Thanh-Nhan P. Nguyen
(74) *Attorney, Agent, or Firm*—McKenna Long & Aldridge LLP

(57) ABSTRACT

A liquid crystal display device includes first and second substrates facing and spaced apart from each other; a first polarizing film on an outer surface of the first substrate; a liquid crystal layer between the first and second substrates; a backlight unit under the second substrate; and a cholesteric liquid crystal polarizing film between the second substrate and the backlight unit, the cholesteric liquid crystal polarizing film having a first portion adjacent to the backlight unit, a second portion adjacent to an outer surface of the second substrate and a third portion between the first and second portions, the first and second portions respectively having first and second pitches, the third portion having a third pitch having a value between the first and second pitches.

32 Claims, 3 Drawing Sheets

LIQUID CRYSTAL DISPLAY DEVICE HAVING CHOLESTERIC LIQUID CRYSTAL POLARIZING FILM AND INTERNAL RETARDATION FILM AND INTERNAL POLARIZING FILM

This application claims the benefit of Korean Patent Application Nos. 2002-39981, filed on Jul. 10, 2002, and 2002-49846, filed on Aug. 22, 2002, which are hereby incorporated by references for all purposes as if fully set forth herein.

BACKGROUND OF THE INVENTION

1. Field of the Invention

The present invention relates to liquid crystal display devices, and more particularly to transmissive liquid crystal display devices having a cholesteric liquid crystal polarizing plate and a cholesteric liquid crystal color filter layer.

2. Discussion of the Related Art

Generally, liquid crystal display (LCD) devices operate using optical anisotropy and polarization properties inherent to liquid crystal molecules. Liquid crystal molecules have definite orientational alignment characteristics resulting from their thin and long shape. The orientational alignment of liquid crystal molecules can be controlled by applying an electric field to the liquid crystal molecules wherein, as the intensity of the applied electric field changes, the orientational alignment of the liquid crystal molecules also changes. The intensity of light incident the liquid crystal molecules can be selectively controlled to display images due to the aforementioned anisotropic optical properties of the liquid crystal molecules, wherein incident light becomes refracted due to the orientation of the liquid crystal molecules.

Active matrix LCD (AM-LCD) devices include thin film transistors (TFTs) and pixel electrodes, connected to the TFTs, arranged in a matrix pattern and are capable of images at a high resolution as well as moving images.

FIG. 1 illustrates a schematic perspective view of a related art LCD device.

Referring to FIG. 1, the related art LCD device 11 includes an upper substrate 5 (i.e., the color filter substrate) separated from a lower substrate 22 (i.e., the array substrate) by a layer of liquid crystal material 14. A black matrix layer 6 and a color filter layer 8 having red, green and blue sub color filters 8a, 8b, and 8c, respectively, formed on the upper substrate 5. A transparent common electrode 18 is formed on the color filter layer 8 and on the black matrix layer 6. The lower substrate 22 supports array lines such as gate lines 13, data lines 15, and switching elements "T" connected to respective ones of the gate and data lines 13 and 15, respectively. Pixel electrodes 17 are formed in a pixel region "P" of the lower substrate 22, defined by crossings of the gate and data lines 13 and 15, respectively. The pixel electrode 17 at the pixel region "P" is made of a transparent conductive material such as indium-tin-oxide (ITO), indium-zinc-oxide (IZO), or other material having high light transmittance characteristics. A light source such as a backlight unit (not shown) is disposed beneath the LCD device 11.

When gate signals are applied to switching elements "T", data signals are applied to corresponding ones of the pixel electrodes 17. Likewise, when gate signals are not applied to the switching elements "T", data signals are not applied to the corresponding ones of the pixel electrodes 17. Accordingly, the LCD device behaves as a light modulating device, modulating light provided by the backlight unit that passes through a plurality of optical films to display images.

The aforementioned related art LCD device, however, uses the light provided by the backlight unit in a relatively inefficient manner. For example, the aforementioned plurality of optical films generally include a pair of linear polarizing plates, transmitting a linear component of the light provided by the backlight unit in a single direction, and a color filter layer. Accordingly, less than about half of the light provided by the backlight unit is transmitted by the pair of linear polarizing plates, thereby reducing the brightness of the LCD device. Further, the aforementioned color filter layer is provided as an absorption type filter that greatly reduces the intensity of the light provided by the backlight unit, thereby further reducing the brightness of the LCD device.

To alleviate the problematic reduction in LCD device brightness, absorptive color filter layers having a high light transmittance characteristics have been used. However, as the light transmittance characteristics of absorptive color filter layers increase, their ability to generate light having high color purity decreases. Accordingly, there is a limit to which the light transmittance characteristics of absorptive color filter layers can be increased.

To solve the aforementioned problems of absorptive color filter layers in LCD devices, LCD devices using cholesteric liquid crystal color filter (CCF) layers have been researched and developed. CCF layers use selective reflection properties inherent to cholesteric liquid crystal (CLC) material from which they are formed to selectively reflect/transmit light within a predetermined wavelength range. The selective reflection/transmission properties of CCF layers are dependent upon a helical pitch of the CLC material from which they are formed. Accordingly LCD devices may include CCF layers made of CLC material having different helical pitches corresponding to predetermined pixel regions. By replacing absorptive color filter layers with CCF layers, the efficiency with which light generated by backlight units is used may be increased.

FIG. 2 illustrates a schematic cross-sectional view of a related art reflective LCD device including a related art CCF layer.

Referring to FIG. 2, first substrate 5 opposes and is spaced apart from second substrate 22. A first electrode 18 made of transparent conductive material is formed on an inner surface of the first substrate 5. A retardation film 30 and a linear polarizing film 32 are subsequently and successively formed on an outer surface of the first substrate 5. A cholesteric liquid crystal color filter (CCF) layer 24 is formed on an inner surface of the second substrate 22 by depositing and patterning molecules of cholesteric liquid crystal (CLC). While not shown, the CCF layer 24 includes sub cholesteric liquid crystal color filters (sub CCFs), capable of reflecting light at wavelengths corresponding to red, green, and blue colors. A second electrode 17 made of transparent conductive material is formed on the CCF layer 24. A light-absorbing layer 34, made of a light absorbing material such as a polymer, is formed on an outer surface of the second substrate 22. Lastly, a layer of liquid crystal material 14 is interposed between the first and second electrodes 18 and 17.

As mentioned above, the CCF layer 24 is formed using CLC material that selectively reflects/transmits right-handed (or left handed) circularly polarized light having a wavelength range in accordance with a helical pitch of the CLC material. Accordingly, the wavelength range of the light selectively reflected/transmitted by the CCF layer 24 may be adjusted by adjusting the pitch of the CLC. A central wavelength of the wavelength band corresponds to one of red, green and blue colors. As a result, the CCF layer 24 can selectively reflect red, green and blue light by adjusting a pitch of the CLC wherein the reflected light is subsequently transmitted within a corresponding red, green, or blue pixel region by recycling the reflected light. More specifically, the light reflected by the CCF layer has a higher intensity than light selectively transmitted by the aforementioned absorptive color filter layer. Accordingly, color purity and a color reproducibility may be improved.

However, even though the aforementioned related art reflective LCD device, including the CCF layer, yields improved color purity and improved color reproducibility, the related art reflective LCD device uses light provided by the backlight unit inefficiently because all light, except for the reflected light, is absorbed by the light-absorbing layer 34. As a result, the related art reflective LCD device has poor brightness and a poor contrast ratio.

SUMMARY OF THE INVENTION

Accordingly, the present invention is directed to a liquid crystal display device that substantially obviates one or more of the problems due to limitations and disadvantages of the related art.

An advantage of the present invention provides a transmissive liquid crystal display device including a cholesteric liquid crystal color filter layer and a cholesteric liquid crystal polarizing film.

Another advantage of the present invention provides a transmissive liquid crystal display device having an increased brightness and contrast ratio compared to the related art liquid crystal display devices.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may, for example, include a first substrate having an inner surface and an outer surface; a second substrate having an inner surface and an outer surface, wherein the inner surface of the second substrate faces and is spaced apart from the inner surface of the first substrate; a first polarizing film formed on the outer surface of the first substrate; a liquid crystal layer formed between the first and second substrates; a backlight unit proximate the outer surface of the second substrate; and a cholesteric liquid crystal polarizing film formed between the second substrate and the backlight unit, wherein the cholesteric liquid crystal polarizing film includes a first portion adjacent to the backlight unit, a second portion adjacent to the outer surface of the second substrate, and a third portion between the first and second portions, wherein the first and second portions include first and second pitches, respectively, and the third portion includes a third pitch, wherein a value of the third pitch is between values of the first and second pitches.

In one aspect of the present invention, the first pitch is greater than the second pitch.

In another aspect of the present invention, the liquid crystal display device may further include a cholesteric liquid crystal color filter layer formed on the inner surface of the second substrate.

In yet another aspect of the present invention, the liquid crystal display device may further include a retardation film formed on the inner surface of the second substrate.

In still another aspect of the present invention, the liquid crystal display device may further include a second polarizing film formed on the retardation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used throughout the drawings to refer to the same or like parts.

Figure 1:
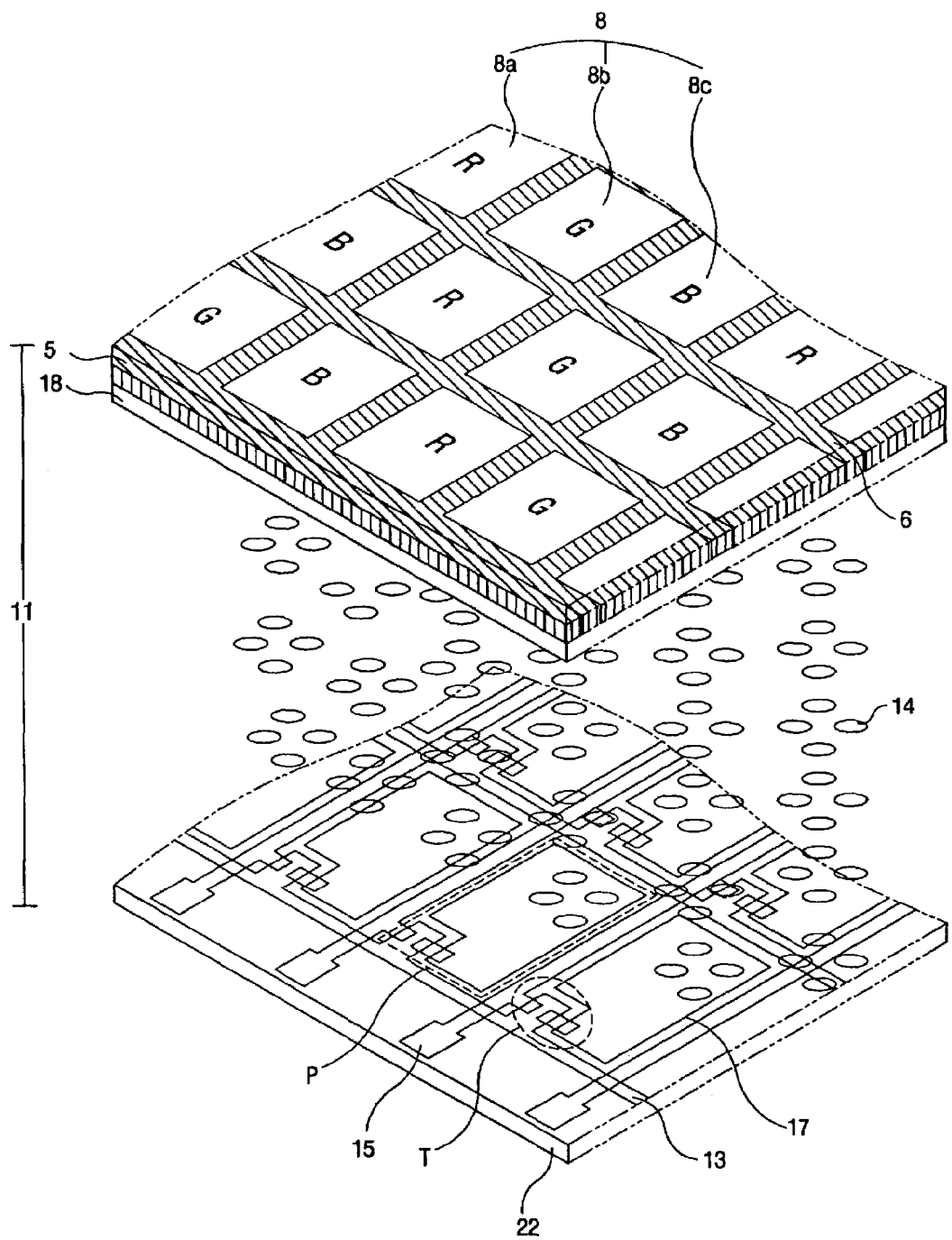
FIG. 1 illustrates a schematic perspective view of a related art LCD device.
Figure 2:
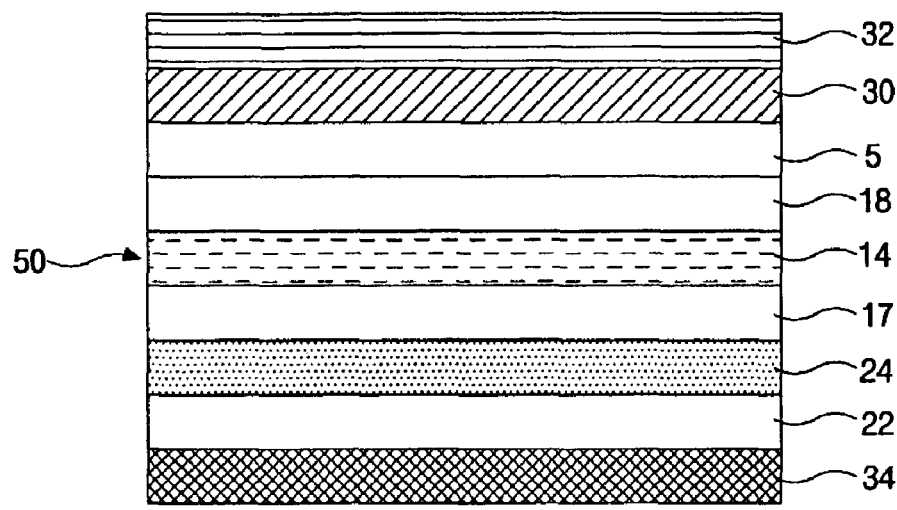
FIG. 2 illustrates a schematic cross-sectional view of a related art reflective LCD device including a related art CCF layer.
Figure 3:
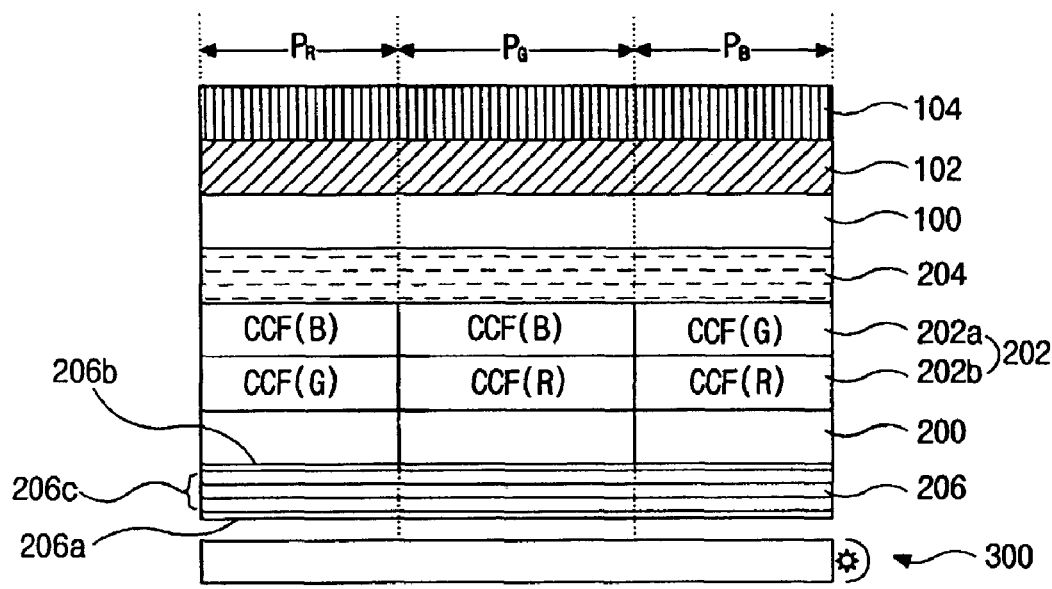
FIG. 3 illustrates a schematic cross-sectional view of a LCD device according to one aspect of the present invention.

FIG. 3 illustrates a schematic cross-sectional view of a LCD device according to one aspect of the present invention.

Referring to FIG. 3, a LCD device according to one aspect of the present invention may, for example, include a first substrate 100 having an inner surface and an outer surface and a second substrate 200 having an inner surface and an outer surface, wherein the inner surface of the second substrate 200 faces and is spaced apart from the inner surface of the first substrate 100. Further, each of the first and second substrates 100 and 200, respectively, may include red, green, and blue pixel regions "$P_R$", "$P_G$", and "$P_B$", respectively. A retardation film 102 (e.g., a broadband quarter wave plate (QWP), or the like) may be formed on the outer surface of the first substrate 100 and a first polarizing film 104, capable of linearly polarizing incident light, may be formed on the retardation film 102. A cholesteric liquid crystal color filter (CCF) layer 202 may be formed on the inner surface of the second substrate 200 and a cholesteric liquid crystal (CLC) polarizing film 206 may be formed on the outer surface of the second substrate 200. A layer of liquid crystal material 204 having, for example, an optically compensated birefringence (OCB) mode, may be interposed between the first substrate 100 and the CCF layer 202.

Further, a backlight unit 300 may be disposed proximate the outer surface of the second substrate 200 such that the CLC polarizing film 206 is between the backlight unit 300 and the second substrate 200.

In one aspect of the present invention, the CCF layer 202 may be formed of CLC material having different pitches across each of the pixel regions wherein the pitch of the CLC material within each pixel region may be adjusted to selectively reflect only left-handed circularly polarized light within a predetermined wavelength range. Accordingly, the portion of the CCF layer 202 arranged the red pixel region "$P_R$" may transmit red light. In another aspect of the present invention, the portion of the CCF layer 202 arranged the green pixel region "$P_G$" may transmit only green light. In yet another aspect of the present invention, the portion of the CCF layer 202 arranged the blue pixel region "$P_B$" may transmit only blue light. As the wavelength of light reflected from the CCF layer 202 is determined by the helical pitch of molecules within the CLC material, the predetermined wavelength range of the reflected light may be adjusted by adjusting a pitch of the molecules of the CLC material arranged within the red, green, and blue pixel regions "$P_R$," "$P_G$" and "$P_B$", respectively.

Typically, the wavelength range of visible light is between about 400 nm and about 700 nm wherein the wavelength of red, green, and blue light is about 660 nm, about 530 nm, and about 470 nm, respectively. Accordingly, the CCF layer 202 may be formed to selectively transmit light having wavelengths corresponding to red, green, and blue within respective ones of the pixel regions "$P_R$," "$P_G$" and "$P_B$" by selectively adjusting the pitch of the CCF layer 202. By selectively adjusting the pitch of the CCF layer 202, the LCD device of the present invention may display high purity, full color images. In one aspect of the present invention, the reflected light may be transmitted via recycling, as will be discussed in greater detail below, such that the CCF layer 202 enables images to be displayed at higher contrast ratios compared to the related art absorptive color filter layer.

In accordance with the principles of the present invention, the CCF layer 202 include first and second CCF layers 202a and 202b capable of selectively reflecting left-handed circularly polarized light having wavelengths representing different colors within each of the red, green, and blue pixel regions "$P_R$," "$P_G$" and "$P_B$" For example, the portion of the first CCF layer 202a arranged within the red pixel region "$P_R$" may be formed of CLC material having a pitch capable of selectively reflecting blue left-handed circularly polarized light while the portion of the second CCF layer 202b arranged within the red pixel region "$P_R$" may be formed of CLC material having a pitch capable of selectively reflecting green left-handed circularly polarized light. Further, the portion of the first CCF layer 202a arranged within the green pixel region "$P_G$" may be formed of CLC material having a pitch capable of selectively reflecting blue left-handed circularly polarized light while the portion of the second CCF layer 202b arranged within the green pixel region "$P_G$" may be formed of a material having a pitch capable of selectively reflecting red left-handed circularly polarized light. Still further, the portion of the first CCF layer 202a arranged within the blue pixel region "$P_B$" may be formed of a material having a pitch capable of selectively reflecting green left-handed circularly polarized light while the portion of the second CCF layer 202b arranged within the blue pixel region "$P_B$" may be formed of a material having a pitch capable of selectively reflecting red left-handed circularly polarized light. Accordingly, and as mentioned above, left-handed circularly polarized light having wavelengths corresponding to red, green, and blue colors can be selectively transmitted within the red, green, and blue pixel regions "$P_R$," "$P_G$" and "$P_B$", respectively.

According to the principles of the present invention, the backlight unit 300 may be capable of emitting substantially non-polarized light. In one aspect of the invention, the CLC polarizing film 206 may circularly polarize the substantially non-polarized light emitted from the backlight unit 300. In another aspect of the present invention, the CLC polarizing film 206 may polarize the light emitted from the backlight unit 300 into left-handed circularly polarized light.

According to the principles of the present invention, the polarization state of the light reflectable (or transmittable) by the CCF layer 202 may be substantially opposite the polarization state of the light reflectable (or transmittable) by the CLC polarizing film 206. In one aspect of the present invention, the CLC polarizing film 206 may reflect right-handed circularly polarized light. Further, the CLC polarizing film 206 may reflect right-handed circularly polarized light having a wavelength range of about 380 nm to about 780 nm. Still further, the CLC polarizing film 206 may transmit left-handed circularly polarized light having a wavelength range of about 380 nm to about 780 nm. In another aspect of the present invention, light reflected by the CLC polarizing film 206 may be transmitted through the CCF layer 202 such that a high brightness and high contrast ratio can be obtained over the aforementioned related art absorptive color filter layer.

In accordance with the principles of the present invention, the CLC polarizing film 206 may, for example, include a first portion 206a adjacent to the backlight unit 300, a second portion 206b adjacent to the outer surface of the second substrate 200 and a third portion 206c between the first and second portions 206a and 206b, respectively. In one aspect of the present invention, each of the first, second, and third portions 206a, 206b, and 206c, respectively, may be formed of CLC material having first, second, and third pitches, respectively. In another aspect of the present invention, the values of the first and second pitches may be different and the value of the third pitch may be between the values of the first and second pitches.

In one aspect of the present invention the first pitch (or the second pitch) may be about 780 nm and the second pitch (or the first pitch) may be about 380 nm. In another aspect of the present invention, the first pitch (or second pitch) may be about 580 nm to about 780 nm. In another aspect of the present invention, the second pitch (or first pitch) may be about 480 nm to about 580 nm. In another aspect of the present invention, the third pitch may be about 380 nm to about 480 nm.

A method by which left-handed circularly polarized light having wavelengths corresponding to red, green, and blue colors may be selectively reflected and transmitted in accordance with the principles of the present invention to display an image will now be explained in greater detail.

As mentioned above, light emitted from the backlight unit 300 may be polarized by the CLC polarizing film 206 into left-handed circularly polarized light corresponding to visible light (e.g., light within the aforementioned wavelength range of about 380 nm to about 780 nm). As mentioned above, the CLC polarizing film 206 may reflect right-handed circularly polarized light. Accordingly, the left-handed circularly polarized light becomes incident to the second CCF layer 202b. Left-handed circularly polarized light incident the portion of the second CCF layer 202b arranged within, for example, the green pixel region "$P_G$" may be selectively reflected in accordance with the CLC material it is formed of. Since, as mentioned above, the portion of the second CCF layer 202b arranged within the green pixel region "$P_G$" is formed of CLC material having a pitch capable of selectively reflecting red light, only the wavelength range of the left-handed circularly polarized light representing a red color may be reflected back towards the CLC polarizing film 206. As a result, the remaining wavelength ranges of the left-handed circularly polarized light representing the green and blue colors may be selectively transmitted through the portion of the second CCF layer 202b arranged within the green pixel region "$P_G$" to the portion of the first CCF layer 202a arranged within the green pixel region "$P_G$". Upon arriving at the portion of the first CCF layer 202a arranged within the green pixel region "$P_G$", only the wavelength range of the left-handed circularly polarized light representing a blue color may be reflected towards the CLC polarizing film 206. Accordingly, only the wavelength range of the left-handed circularly polarized light representing a green color may be transmitted by the portion of the CCF layer 202 arranged within the green pixel region "$P_G$". Similarly, as discussed with respect to the green pixel region "$P_G$", the aforementioned selective reflection of left-handed circularly polarized light based may similarly occur in the portions of the CCF layer 202 arranged within the red and blue pixel regions "$P_R$" and "$P_B$", respectively. Accordingly, left-handed circularly polarized light having wavelength ranges representing red and blue colors may be selectively transmitted by portions of the CCF layer 202 arranged within the red and blue pixel regions "$P_R$" and "$P_B$", respectively. Consequently, the left-handed circularly polarized light transmitted by the CCF layer 202 may be successively transmitted through the retardation film 102 and the first polarizing film 104 to be subsequently emitted by the LCD device of the present invention to display full color images at a high contrast ratio.

Shown below, Table 1 illustrates results of two tests for a liquid crystal display device according to a first embodiment of the present invention.

TABLE 1

| director of first CLC layer 202a/ director of second CLC layer 202b | FIRST TYPE (first portion 206a-longer pitch second portion 206b-shorter pitch) | | SECOND TYPE (first portion 206a-shorter pitch second portion 206b-longer pitch) | |
|---|---|---|---|---|---|
| | contrast ratio | brightness white state | black state | contrast ratio | brightness white state | black state |
| FIRST TEST (first CLC layer 202a-blue second CLC layer 202b-red) | 90/0 | 98.5 | 30.86 | 0.31 | 88.1 | 30.79 | 0.35 |
| | 0/90 | 72.0 | 31.21 | 0.43 | 56.9 | 31.18 | 0.55 |
| | 0/45 | 114.6 | 29.31 | 0.26 | 92.3 | 29.11 | 0.32 |
| | 45/0 | 93.1 | 30.98 | 0.33 | 92.4 | 31.25 | 0.54 |
| | 45/−45 | 65.4 | 31.11 | 0.48 | 58.0 | 31.25 | 0.54 |
| SECOND TEST (first CLC layer 202a-red second CLC layer 202b-blue) | 90/0 | 68.3 | 29.98 | 0.44 | 67.7 | 29.74 | 0.52 |
| | 0/90 | 119.5 | 29.61 | 0.25 | 95.0 | 29.74 | 0.31 |
| | 0/45 | 114.0 | 31.24 | 0.27 | 100.2 | 31.24 | 0.31 |
| | 45/0 | 97.8 | 29.02 | 0.30 | 81.8 | 28.85 | 0.35 |
| | 45/−45 | 101.0 | 29.64 | 0.29 | 78.9 | 29.57 | 0.38 |

As indicated in the first test of Table 1, portions of the first and second CCF layers 202a and 202b arranged within the green pixel region "$P_G$" were formed of CLC material capable of reflecting light having wavelength ranges representing blue and red, respectively. As indicated in the second test of Table 1, portions of the first and second CCF layers 202a and 202b arranged within the green pixel region "$P_G$" were formed of CLC material capable of reflecting light having wavelength ranges representing red and blue, respectively. Moreover, values of directors of the first and second CCF layers 202a and 202b range from about 90/0, 0/90, 0/45, 45/0, and 45/−45 for the first and second tests, wherein "90/0", "0/90", "0/45", "45/0", and "45/−45" indicate the relative orientations of the directors of the first and second CCF layers 202a and 202b.

Two types of CLC polarizing films 206 were provided during each test. Within the first type of CLC polarizing film, the value of the pitch of the first portion 206a adjacent the backlight unit 300 was greater than (i.e., longer than) the value of the pitch of the second portion 206b adjacent the outer surface of the second substrate 200. In the second type CLC polarizing film, the value of the first portion 206a adjacent to the backlight unit 300 was less than (i.e., shorter than) the value of the pitch of the second portion 206b adjacent the outer surface of the second substrate 200.

In one aspect of the present invention, the CLC polarizing film 206 may, for example, include an ordinary refractive index "$n_o$" of about 1.5 and an extra-ordinary refractive index "$n_e$" of about 1.68. In another aspect of the present invention, the CLC polarizing film 206 may have a thickness of about 30 μm. As can be seen from Table 1 above, contrast ratio and brightnesses of white and black states were measured based on every combination.

As can be seen in Table 1, while a brightness of the white state LCD device using the first type of CLC polarizing film is similar to the brightness of the white state LCD device using the second type of CLC polarizing film, a brightness of the black state LCD device using the first type of CLC polarizing film is less than a brightness of the black state LCD device using the second type of CLC polarizing film. Thus, for every one of the relative directions of the directors of the first and second CCF layers 202a and 202b in each test, LCD devices using the first type of CLC polarizing film have a greater contrast ratio than LCD devices using the second type of CLC polarizing film.

As mentioned above with respect to FIG. 3 and Table 1, the CCF layer 202 reflects only left-handed circularly polarized light while the CLC polarizing film 206 reflects only right-handed circularly polarized light. In another aspect of the present invention, however, the LCD device shown in FIG. 3 may be formed such that the CCF layer reflects only right-handed circularly polarized light and the CLC polarizing film reflects only left-handed circularly polarized light.

Figure 4:
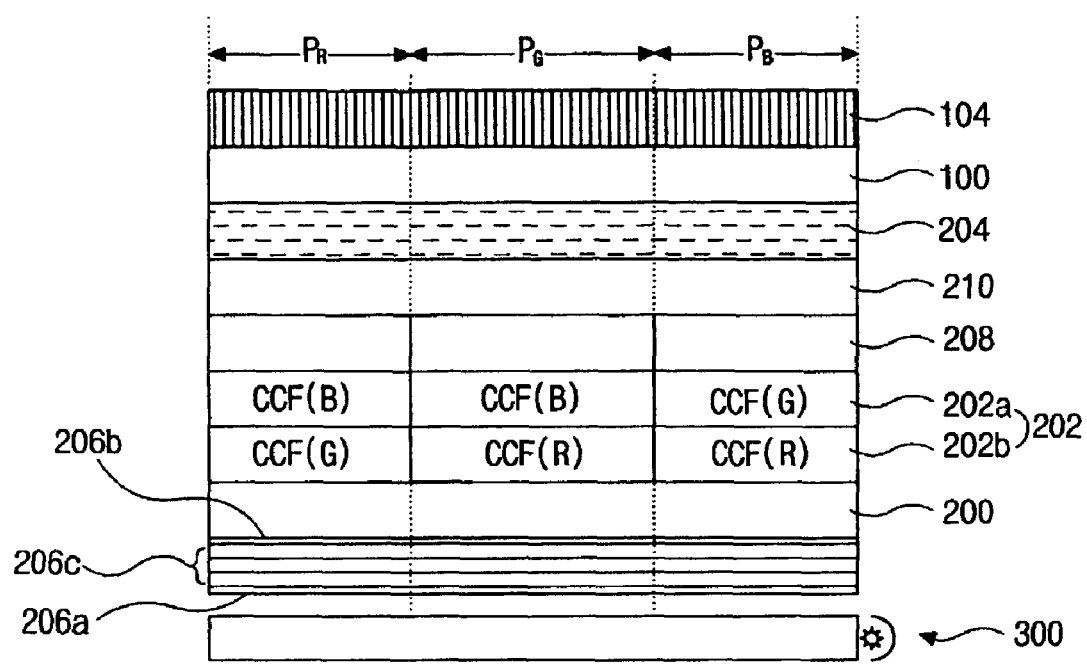
FIG. 4 illustrates a schematic cross-sectional view of a LCD device according to another aspect of the present invention.

FIG. 4 illustrates a schematic cross-sectional view of a LCD device according to another aspect of the present invention.

Referring to FIG. 4, a LCD device according to another aspect of the present invention may, for example, include a first substrate 100 having an inner surface and an outer surface and a second substrate 200 having an inner surface and an outer surface, wherein the inner surface of the second substrate 200 faces and is spaced apart from the inner surface of the first substrate. Further, each of the first and second substrates 100 and 200, respectively, may include red, green, and blue pixel regions "$P_R$", "$P_G$", and "$P_B$", respectively. A first polarizing film 104 for linearly polarizing incident light may be formed on the outer surface of the first substrate 100. A cholesteric liquid crystal color filter (CCF) layer 202 may be formed on the inner surface of the second substrate 200. A retardation film 208 (e.g., a quarter wave plate (QWP), or the like) may be formed on the CCF layer 202 and a second polarizing film 210 for linearly polarizing incident light may be formed on the retardation film 208. A layer of liquid crystal material 204 having, for example, a twisted nematic (TN), mode may be interposed between the first substrate 100 and the second polarizing film 210. A cholesteric liquid crystal (CLC) polarizing film 206 may be formed on the outer surface of the second substrate 200 and a backlight unit 300 may be disposed proximate the outer surface of the second substrate 200 such that the CLC polarizing film 206 is between the backlight unit 300 and the second substrate 200.

In one aspect of the present invention, the CCF layer 202 may be formed of CLC material having different pitches across each of the pixel regions wherein the pitch of the CLC material within each pixel region may be adjusted to selectively reflect only left-handed circularly polarized light within a predetermined wavelength range. Accordingly, the portion of the CCF layer 202 arranged the red pixel region "$P_R$" may transmit red light. In another aspect of the present invention, the portion of the CCF layer 202 arranged the green pixel region "$P_G$" may transmit only green light. In yet another aspect of the present invention, the portion of the CCF layer 202 arranged the blue pixel region "$P_B$" may transmit only blue light. As the wavelength of light reflected from the CCF layer 202 is determined by the pitch of molecules within the CLC material, the predetermined wavelength range of the reflected light may be adjusted by adjusting a pitch of the molecules of the CLC material arranged within the red, green, and blue pixel regions "$P_R$," "$P_G$" and "$P_B$", respectively.

Typically, the wavelength range of visible light is between about 400 nm and about 700 nm wherein the wavelength of red, green, and blue light is about 660 nm, about 530 nm, and about 470 nm, respectively. Accordingly, the CCF layer 202 may be formed to selectively transmit light having wavelengths corresponding to red, green, and blue within respective ones of the pixel regions "$P_R$," "$P_G$" and "$P_B$" by selectively adjusting the pitch of the CCF layer 202. By selectively adjusting the pitch of the CCF layer 202, the LCD device of the present invention may display high purity, full color images. In one aspect of the present invention, the reflected light may be transmitted via recycling such that the CCF layer 202 enables images to be displayed at higher contrast ratios compared to the related art absorptive color filter layer.

In accordance with the principles of the present invention, the CCF layer 202 include first and second CCF layers 202a and 202b capable of selectively reflecting left-handed circularly polarized light having wavelengths representing different colors within each of the red, green, and blue pixel regions "$P_R$," "$P_G$" and "$P_B$". For example, the portion of the first CCF layer 202a arranged within the red pixel region "$P_R$" may be formed of CLC material having a pitch capable of selectively reflecting blue left-handed circularly polarized light while the portion of the second CCF layer 202b arranged within the red pixel region "$P_R$" may be formed of CLC material having a pitch capable of selectively reflecting green left-handed circularly polarized light. Further, the portion of the first CCF layer 202a arranged within the green pixel region "$P_G$" may be formed of CLC material having a pitch capable of selectively reflecting blue left-handed circularly polarized light while the portion of the second CCF layer 202b arranged within the green pixel region "$P_G$" may be formed of a material having a pitch capable of selectively reflecting red left-handed circularly polarized light. Still further, the portion of the first CCF layer 202a arranged within the blue pixel region "$P_B$" may be formed of a material having a pitch capable of selectively reflecting green left-handed circularly polarized light while the portion of the second CCF layer 202b arranged within the blue pixel region "$P_B$" may be formed of a material having a pitch capable of selectively reflecting red left-handed circularly polarized light. Accordingly, and as mentioned above, left-handed circularly polarized light having wavelengths corresponding to red, green, and blue colors can be selectively transmitted within the red, green, and blue pixel regions "$P_R$," "$P_G$" and "$P_B$", respectively.

According to the principles of the present invention, the backlight unit 300 may be capable of emitting substantially non-polarized light. In one aspect of the invention, the CLC polarizing film 206 may circularly polarize the substantially non-polarized light emitted from the backlight unit 300. In another aspect of the present invention, the CLC polarizing film 206 may polarize the light emitted from the backlight unit 300 into left-handed circularly polarized light.

According to the principles of the present invention, the polarization state of the light reflectable (or transmittable) by the CCF layer 202 may be substantially opposite the polarization state of the light reflectable (or transmittable) by the CLC polarizing film 206. In one aspect of the present invention, the CLC polarizing film 206 may reflect right-handed circularly polarized light. Further, the CLC polarizing film 206 may reflect right-handed circularly polarized light having a wavelength range of about 380 nm to about 780 nm. Still further, the CLC polarizing film 206 may transmit left-handed circularly polarized light having a wavelength range of about 380 nm to about 780 nm. In another aspect of the present invention, light reflected by the CLC polarizing film 206 may be transmitted through the CCF layer 202 such that a high brightness and high contrast ratio can be obtained over the aforementioned related art absorptive color filter layer.

In accordance with the principles of the present invention, the CLC polarizing film 206 may, for example, include a first portion 206a adjacent to the backlight unit 300, a second portion 206b adjacent to the outer surface of the second substrate 200 and a third portion 206c between the first and second portions 206a and 206b, respectively. In one aspect of the present invention, each of the first, second, and third portions 206a, 206b, and 206c, respectively, may be formed of CLC material having first, second, and third pitches, respectively. In another aspect of the present invention, the values of the first and second pitches may be different and the value of the third pitch may be between the values of the first and second pitches.

A method by which left-handed circularly polarized light having wavelengths corresponding to red, green, and blue colors may be selectively reflected and transmitted in accordance with the principles of the present invention to display an image will now be explained in greater detail.

As mentioned above, light emitted from the backlight unit 300 may be polarized by the CLC polarizing film 206 into left-handed circularly polarized light corresponding to visible light (e.g., light within the aforementioned wavelength range of about 380 nm to about 780 nm). As mentioned above, the CLC polarizing film 206 may reflect right-handed circularly polarized light. Accordingly, the left-handed circularly polarized light becomes incident to the second CCF layer 202b. Left-handed circularly polarized light incident the portion of the second CCF layer 202b arranged within, for example, the green pixel region "$P_G$" may be selectively reflected in accordance with the CLC material it is formed of. Since, as mentioned above, the portion of the second CCF layer 202b arranged within the green pixel region "$P_G$" is formed of CLC material having a pitch capable of selectively reflecting red light, only the wavelength range of the left-handed circularly polarized light representing a red color may be reflected back towards the CLC polarizing film 206. As a result, the remaining wavelength ranges of the left-handed circularly polarized light representing the green and blue colors may be selectively transmitted through the portion of the second CCF layer 202*b* arranged within the green pixel region "$P_G$" to the portion of the first CCF layer 202*a* arranged within the green pixel region "$P_G$". Upon arriving at the portion of the first CCF layer 202*a* arranged within the green pixel region "$P_G$", only the wavelength range of the left-handed circularly polarized light representing a blue color may be reflected towards the CLC polarizing film 206. Accordingly, only the wavelength range of the left-handed circularly polarized light representing a green color may be transmitted by the portion of the CCF layer 202 arranged within the green pixel region "$P_G$" Similarly, as discussed with respect to the green pixel region "$P_G$", the aforementioned selective reflection of left-handed circularly polarized light based may similarly occur in the portions of the CCF layer 202 arranged within the red and blue pixel regions "$P_R$" and "$P_B$", respectively. Accordingly, left-handed circularly polarized light having wavelength ranges representing red and blue colors may be selectively transmitted by portions of the CCF layer 202 arranged within the red and blue pixel regions "$P_R$" and "$P_B$", respectively. Consequently, the left-handed circularly polarized light transmitted by the CCF layer 202 may be successively transmitted through the retardation film 102 and the first polarizing film 104 to be subsequently emitted by the LCD device of the present invention to display full color images at a high contrast ratio.

The aforementioned recycling process will now be described in greater detail below. According to the principles of the present invention, an interface between the second substrate 200 and the CCF layer 202 may exist, wherein the materials forming the second substrate 200 and the CCF layer 202 at the interface may have different refractive indices. Accordingly, the left-handed circularly polarized light transmitted by the CLC polarizing film 206 may be reflected at the interface between the second substrate 200 and the CCF layer 202 regardless of the wavelength of the light. As a result, the "handedness" of the polarization circularly polarized light may become inverted such that reflected light that was left-handed circularly polarized becomes right-handed circularly polarized light, and vise versa. The aforementioned polarization inversion, however, does not occur when circularly polarized light is reflected by the CLC polarizing film 206.

Accordingly, left-handed circularly polarized light, reflected by the portions of the CCF layer within the pixel regions, becomes right-handed circularly polarized light reflected at the interface between the second substrate 200 and the CCF layer 202 and becomes incident to the CLC polarizing film 206. As mentioned above, the CLC polarizing film 206 reflects only right-handed circularly polarized light, therefore, the incident right-handed circularly polarized light, transmitted from the interface between the second substrate 200 and the CCF layer 202, is reflected by the CLC polarizing film 206. Since the CCF layer 202 reflects only left-handed circularly polarized light, the right-handed circularly polarized light reflected by the CLC polarizing film 206 is transmitted through the CCF layer 202.

While though the right-handed circularly polarized light may more than double the brightness of the LCD, the right-handed circularly polarized light may also limit the degree to which the contrast ratio of the LCD may be increased. For example, during the white state of a normally white driving mode, the wavelength range of the right-handed circularly polarized light representing a green color passes through the CCF layer 202 and increases the brightness of the LCD. During the black state of a normally white driving mode, the wavelength range of the left-handed circularly polarized light representing the green color may be absorbed by the first polarizing film 104 while right-handed circularly polarized light, generated by the aforementioned recycling process, may be transmitted by the first polarizing film 104. Accordingly, even though the brightness of the LCD may increase, an increase in contrast ratio may be limited due to the light generated by the recycling process.

Referring to FIG. 4, the limit to the aforementioned contrast ratio be improved by providing a retardation film 208 and second polarizing film 210. During the black state of a normally white driving mode, left-handed and right-handed circularly polarized light transmitted by the CCF layer 202 is linearly polarized by the retardation film 208. According to the principles of the present invention, the polarization direction of linearly polarized light generated from left-handed circularly polarized light is different from the linearly polarized light generated from right-handed circularly polarized light. Therefore, and in one aspect of the present invention, the linearly polarized light generated from right-handed circularly polarized light may be absorbed by the second polarizing film 210 and the contrast ratio of the LCD shown in FIG. 4 may be increased by about fifteen times to about twenty times greater than the contrast ratio of the LCD shown in FIG. 3.

In one aspect of the present invention, the retardation film 208 and the second polarizing film 210 may be formed on the CCF layer 202 via a direct coating method. Since a change of polarization state between the CLC polarizing film 206 and the CCF layer 202 affects the contrast ratio of the LCD device, the difference between the refractive indexes of the retardation film 208 and the second polarizing film 210 should be determined to optimize the contrast ratio of the LCD.

While it has been shown that the CCF layer 202 reflects only left-handed circularly polarized light and the CLC polarizing film reflects only right-handed circularly polarized light, the principles of the present invention may be extended to provide an LCD device including a CCF layer reflecting only right-handed circularly polarized light and a CLC polarizing film reflecting only left-handed circularly polarized light.

In one aspect of the present invention, the liquid crystal display device provides the cholesteric liquid crystal color filter layer to obtain a high color purity. In another aspect of the present invention, the liquid crystal display device provides the cholesteric liquid crystal color filter layer and the cholesteric liquid crystal polarizing film to obtain a high brightness. In yet another aspect of the present invention, the liquid crystal display device provides a cholesteric liquid crystal polarizing film, wherein a potion of the cholesteric liquid crystal polarizing film adjacent a backlight unit with a pitch greater than a portion of the cholesteric liquid crystal polarizing film adjacent to a substrate to obtain a high contrast ratio and high display quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a first substrate having an inner surface and an outer surface;
a second substrate having an inner surface and an outer surface, wherein the inner surface of the second substrate faces and is faced apart from the inner surface of the first substrate;
a retardation film arranged on the inner surface of the second substrate;
a second polarizing film arranged on the retardation film;
a first polarizing film on the outer surface of the first substrate;
a layer of liquid crystal material arranged between the first and second substrates;
a backlight unit proximate to the outer surface of the second substrate;
a cholesteric liquid crystal polarizing film arranged between the second substrate and the backlight unit, wherein the cholesteric liquid crystal polarizing film includes a first portion adjacent to the backlight unit, a second portion adjacent to the outer surface of the second substrate, and a third portion between the first and second portions, wherein the first portion includes a first pitch, wherein the second portion includes a second pitch, wherein the third portion includes a third pitch, wherein a value of the third pitch is between values of the first and second pitches.

2. The device according to claim 1, wherein the first pitch is greater than the second pitch.

3. The device according to claim 1, further comprising a cholesteric liquid crystal color filter layer arranged on the inner surface of the second substrate.

4. The device according to claim 3, wherein the cholesteric liquid crystal color filter layer reflects light having a polarization state that is opposite light reflectable by the cholesteric liquid crystal polarizing film.

5. The device according to claim 4, wherein the cholesteric liquid crystal color filter layer reflects left-handed circularly polarized light; and the cholesteric liquid crystal polarizing film reflects right-handed circularly polarized light.

6. The device according to claim 4, wherein the cholesteric liquid crystal color filter layer reflects right-handed circularly polarized light; and the cholesteric liquid crystal polarizing film reflects left-handed circularly polarized light.

7. The device according to claim 3, wherein
each of the first and second substrates include red, green, and blue pixel regions;
a portion of the cholesteric liquid crystal color filter layer arranged in the red pixel region transmits a red light;
a portion of the cholesteric liquid crystal color filter layer arranged in the green pixel region transmits a green light; and
a portion of the cholesteric liquid crystal color filter layer arranged in the blue pixel region transmits a blue light.

8. The device according to claim 7, wherein
the cholesteric liquid crystal color filter layer includes a first cholesteric liquid crystal layer and a second cholesteric liquid crystal layer;
a portion of the first cholesteric liquid crystal layer arranged within the red pixel region has a pitch for reflecting green light;
a portion of the second cholesteric liquid crystal layer arranged within the red pixel region has a pitch for reflecting blue light;
a portion of the first cholesteric liquid crystal layer arranged within the green pixel region has a pitch for reflecting blue light;
a portion of the second cholesteric liquid crystal layer arranged within in the green pixel region has a pitch for reflecting red light;
a portion of the first cholesteric liquid crystal layer arranged within the blue pixel region has a pitch for reflecting red light; and
a portion of the second cholesteric liquid crystal layer arranged within the blue pixel region has a pitch for reflecting green light.

9. The device according to claim 1, further comprising a retardation film arranged between the first polarizing film and the liquid crystal layer.

10. The device according to claim 9, wherein the liquid crystal layer has an optically compensated birefringence (OCB) mode.

11. The device according to claim 1, wherein light is linearly polarizable by the first and second polarizing films.

12. The device according to claim 1, further comprising a cholesteric liquid crystal color filter layer arranged between the retardation film and the second substrate.

13. The device according to claim 12, wherein the liquid crystal layer has a twisted nematic (TN) mode.

14. The device according to claim 12, wherein the retardation film and the second polarizing film are arranged on the cholesteric liquid crystal color filter layer.

15. The device according to claim 12, wherein the cholesteric liquid crystal color filter layer reflects light having a polarization state that is opposite light reflectable by the cholesteric liquid crystal polarizing film.

16. The device according to claim 15, wherein
the cholesteric liquid crystal color filter layer reflects left-handed circularly polarized light; and
the cholesteric liquid crystal polarizing film reflects right-handed circularly polarized light.

17. The device according to claim 15, wherein
the cholesteric liquid crystal color filter layer reflects right-handed circularly polarized light; and
the cholesteric liquid crystal polarizing film reflects left-handed circularly polarized light.

18. The device according to claim 17, wherein
each of the first and second substrates include red, green, and blue pixel regions;
a portion of the cholesteric liquid crystal color filter layer arranged in the red pixel region transmits a red light;
a portion of the cholesteric liquid crystal color filter layer arranged in the green pixel region transmits a green light; and
a portion of the cholesteric liquid crystal color filter layer arranged in the blue pixel region transmits a blue light.

19. The device according to claim 18, wherein
the cholesteric liquid crystal color filter layer includes a first cholesteric liquid crystal layer and a second cholesteric liquid crystal layer;
a portion of the first cholesteric liquid crystal layer arranged within the red pixel region has a pitch for reflecting green light;
a portion of the second cholesteric liquid crystal layer arranged within the red pixel region has a pitch for reflecting blue light;
a portion of the first cholesteric liquid crystal layer arranged within the green pixel region has a pitch for reflecting blue light;

a portion of the second cholesteric liquid crystal layer arranged within in the green pixel region has a pitch for reflecting red light;

a portion of the first cholesteric liquid crystal layer arranged within the blue pixel region has a pitch for reflecting red light; and a portion of the second cholesteric liquid crystal layer arranged within the blue pixel region has a pitch for reflecting green light.

20. A liquid crystal display, comprising:
a first substrate having an inner surface and an outer surface;
a second substrate having an inner surface and an outer surface, wherein the inner surface of the second substrate faces and is spaced apart from the inner surface of the first substrate;
a cholesteric liquid crystal color filter layer arranged on the inner surface of the second substrate;
a retardation film arranged on the inner surface of the second substrate;
a polarizing film arranged on the retardation film;
a backlight unit proximate to the outer surface of the second substrate;
a cholesteric liquid crystal polarizing film having a first portion adjacent to the backlight unit and a second portion adjacent to the outer surface of the second substrate, wherein
the first portion has a first helical pitch, wherein the second portion has a second helical pitch, different from the first helical pitch; and
the cholesteric liquid crystal color filter layer reflects light having a polarization state that is opposite light reflectable by the cholesteric liquid crystal polarizing film.

21. The liquid crystal display according to claim 20, wherein the first pitch is greater is greater than the second pitch.

22. The liquid crystal display according to claim 20, wherein the cholesteric liquid crystal polarizing film further includes a third portion adjacent the first and second portions.

23. The liquid crystal display according to claim 22, wherein the third portion has a third helical pitch, intermediate the first and second helical pitches.

24. The liquid crystal display according to claim 20, wherein the cholesteric liquid crystal polarizing film has an ordinary refractive index of about 1.5.

25. The liquid crystal display according to claim 20, wherein the cholesteric liquid crystal polarizing film has an extra-ordinary refractive index of about 1.68.

26. The liquid crystal display according to claim 20, wherein the cholesteric liquid crystal polarizing film has thickness of about 30 μm.

27. The liquid crystal display according to claim 20, wherein
the cholesteric liquid crystal color filter layer reflects left-handed circularly polarized light; and
the cholesteric liquid crystal polarizing film reflects right-handed circularly polarized light.

28. The liquid crystal display according to claim 20, wherein
the cholesteric liquid crystal color filter layer reflects right-handed circularly polarized light; and
the cholesteric liquid crystal polarizing film reflects left-handed circularly polarized light.

29. The liquid crystal display according to claim 20, wherein light is linearly polarizable by the polarizing film.

30. The liquid crystal display according to claim 20, further comprising a layer of liquid crystal material arranged between the inner surface of the first substrate and the polarizing film.

31. The liquid crystal display according to claim 20, wherein
each of the first and second substrates include red, green, and blue pixel regions;
a portion of the cholesteric liquid crystal color filter layer arranged in the red pixel region transmits a red light;
a portion of the cholesteric liquid crystal color filter layer arranged in the green pixel region transmits a green light; and
a portion of the cholesteric liquid crystal color filter layer arranged in the blue pixel region transmits a blue light.

32. The liquid crystal display according to claim 31, wherein
the cholesteric liquid crystal color filter layer includes a first cholesteric liquid crystal layer and a second cholesteric liquid crystal layer;
a portion of the first cholesteric liquid crystal layer arranged within the red pixel region has a pitch for reflecting green light;
a portion of the second cholesteric liquid crystal layer arranged within the red pixel region has a pitch for reflecting blue light;
a portion of the first cholesteric liquid crystal layer arranged within the green pixel region has a pitch for reflecting blue light;
a portion of the second cholesteric liquid crystal layer arranged within in the green pixel region has a pitch for reflecting red light;
a portion of the first cholesteric liquid crystal layer arranged within the blue pixel region has a pitch for reflecting red light; and
a portion of the second cholesteric liquid crystal layer arranged within the blue pixel region has a pitch for reflecting green light.

* * * * *